United States Patent
Tsai (10) Patent No.: US 9,497,185 B2
(45) Date of Patent: Nov. 15, 2016

(54) SYSTEMS, METHODS, AND COMPUTER PROGRAM PRODUCTS FOR PROVIDING APPLICATION VALIDATION

(71) Applicant: Google Inc., Mountain View, CA (US)

(72) Inventor: Weimin Tsai, Irving, TX (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/567,184

(22) Filed: Dec. 11, 2014

(65) Prior Publication Data
US 2015/0188698 A1    Jul. 2, 2015

Related U.S. Application Data

(60) Provisional application No. 61/921,935, filed on Dec. 30, 2013.

(51) Int. Cl.
*H04L 29/06* (2006.01)
*H04L 9/08* (2006.01)

(52) U.S. Cl.
CPC .......... *H04L 63/0807* (2013.01); *H04L 9/0822* (2013.01); *H04L 9/0877* (2013.01); *H04L 63/0815* (2013.01)

(58) Field of Classification Search
CPC .......... H04L 63/0807; H04L 63/0815; H04L 9/0822; H04L 9/0877
See application file for complete search history.

(56) References Cited

U.S. PATENT DOCUMENTS

| | | | | |
|---|---|---|---|---|
| 8,543,821 B1 * | 9/2013 | Gabrielson | ...... | H04N 21/23476 713/171 |
| 2003/0182553 A1 * | 9/2003 | Medvinsky | ......... | H04L 63/0807 713/171 |

(Continued)

FOREIGN PATENT DOCUMENTS

WO    2015/102839 A1    7/2015

OTHER PUBLICATIONS

Kim, "International Search Report and Written Opinion issued in International Application No. PCT/US2014/069712 (GOOG-2393WP)", mailed on Feb. 26, 2015, 9 pages.

(Continued)

*Primary Examiner* — Morshed Mehedi
*Assistant Examiner* — Vance Little
(74) *Attorney, Agent, or Firm* — Johnson, Marcou & Isaacs, LLC (57) ABSTRACT

Systems, methods, and computer program products are provided for application validation. A first request is transmitted to a ticket generation application. A first ticket is received, including a first unencrypted portion and a first encrypted portion. A second request is transmitted to the ticket generation application. A second ticket is received, including a second unencrypted portion and a second encrypted portion. The first and second unencrypted portions are concatenated to form an unencrypted shared encryption key. The first and second encrypted portions are concatenated to form an encrypted shared encryption key. The unencrypted shared encryption key is stored in a memory, and the encrypted shared encryption key is transmitted to a server.

18 Claims, 5 Drawing Sheets

(56) References Cited

U.S. PATENT DOCUMENTS

| | | | |
|---|---|---|---|
| 2004/0003287 A1* | 1/2004 | Zissimopoulos | H04L 63/0428 726/10 |
| 2004/0093419 A1* | 5/2004 | Weihl | H04L 63/06 709/229 |
| 2004/0096056 A1* | 5/2004 | Boren | H04L 9/0662 380/28 |
| 2009/0110200 A1* | 4/2009 | Srinivas | G06F 21/335 380/279 |
| 2013/0196931 A1 | 8/2013 | Kampinga et al. | |
| 2013/0204785 A1 | 8/2013 | Monk et al. | |
| 2013/0212399 A1 | 8/2013 | Cairns | |
| 2013/0266141 A1 | 10/2013 | Kim et al. | |
| 2013/0275307 A1* | 10/2013 | Khan | G06Q 20/40 705/64 |

OTHER PUBLICATIONS

Nakamura, "International Preliminary Report on Patentability issued in International Application No. PCT/US2014/069712", mailed on Jul. 14, 2016, 8 pages.

* cited by examiner

SYSTEMS, METHODS, AND COMPUTER PROGRAM PRODUCTS FOR PROVIDING APPLICATION VALIDATION

CROSS REFERENCE TO RELATED APPLICATION

This application claims priority to U.S. Provisional Application No. 61/921,935, filed Dec. 30, 2013, the contents of which are incorporated herein by reference.

BACKGROUND

Field

The present invention relates to application validation, and more particularly to systems, methods, and computer program products for providing key encryption.

Related Art

Applications stored and functioning on mobile devices are increasingly being used to conduct secure communications which require the secure transmission of data between devices.

For example, in a mobile commerce environment, transactions, accounts, products and the like often are stored and processed in or using a mobile wallet application deployed on a mobile device. The mobile wallet application on a mobile device may communicate with a wallet server in order to exchange (e.g., transmit and receive) data and manage aspects of the mobile wallet. These communications often need to be secure, as they may include, for example, sensitive data such as personal or financial data.

For example, in one instance, a user of a mobile wallet application (e.g., on a mobile device) might want to access an issuer's website (e.g., Bank of America, American Express, etc.) via the mobile wallet application interface, rather than through a separate application such as a web browser. To do so, the mobile wallet application must authenticate itself, ideally without having to prompt the user of the mobile wallet application to enter his or her credentials corresponding to the issuer's site each time that access is needed or requested.

Thus, a session single sign-on key is used by the mobile wallet application to authenticate itself to other systems such as a wallet server (in turn, the server notifies the issuer that the client has been authenticated and thus access can be securely provided).

In one example, the sign-on key is encrypted using a hardcoded key that is stored on the mobile wallet application and the wallet server. However, this approach is problematic, because it makes all systems relying on that hardcoded key vulnerable in case the hardcoded key is compromised. Moreover, if the key is changed, this approach requires significant effort to update every system that utilizes the hardcoded key, such as every mobile device having a mobile wallet application. Sending a sign-on key that is not encrypted is not a realistic solution because of security vulnerability problems.

Thus, one technical challenge involves providing a process for encrypting and decrypting a session key at and/or by multiple devices (e.g., a mobile wallet application on a mobile device, a wallet server) which is dynamic (e.g., not common to a large set of clients or servers).

BRIEF DESCRIPTION

The example embodiments presented herein meet the above-identified needs by providing systems, methods, and computer program products for providing application validation, and more particularly for providing key encryption.

In one embodiment, a system for providing application validation includes at least one memory operable to store an application, and a processor coupled to the memory. The processor is operable to transmit a first request to a ticket generation application and receive a first ticket including a first unencrypted portion and a first encrypted portion. The processor is further operable to transmit a second request to the ticket generation application and receive a second ticket including a second unencrypted portion and a second encrypted portion. The processor is operable to concatenate the first and second unencrypted portions to form an unencrypted shared encryption key, and to concatenate the first and second encrypted portions to form an encrypted shared encryption key. The unencrypted shared encryption key in the memory and the encrypted shared encryption key are transmitted to a server.

In another embodiment, a method is provided for application validation. A first request is transmitted to a ticket generation application. A first ticket is received, including a first unencrypted portion and a first encrypted portion. A second request is transmitted to the ticket generation application. A second ticket is received, including a second unencrypted portion and a second encrypted portion. The first and second unencrypted portions are concatenated to form an unencrypted shared encryption key. The first and second encrypted portions are concatenated to form an encrypted shared encryption key. The unencrypted shared encryption key is stored in a memory and the encrypted shared encryption key are transmitted to a server.

In still another embodiment, a non-transitory computer readable storage medium has stored thereon instructions which, when executed by a system including at least one processor and at least one memory, cause the system to perform a method for application validation. A first request is transmitted to a ticket generation application. A first ticket is received, including a first unencrypted portion and a first encrypted portion. A second request is transmitted to the ticket generation application. A second ticket is received, including a second unencrypted portion and a second encrypted portion. The first and second unencrypted portions are concatenated to form an unencrypted shared encryption key. The first and second encrypted portions are concatenated to form an encrypted shared encryption key. The unencrypted shared encryption key is stored in the memory, and the encrypted shared encryption key is transmitted to a server.

BRIEF DESCRIPTION OF THE DRAWINGS

The features and advantages of the present invention will become more apparent from the detailed description set forth below when taken in conjunction with the following drawings.

DETAILED DESCRIPTION

Overview

The example embodiments presented herein are directed to application validation, and more particularly to systems, methods, and computer program products for key encryption, which are described in terms of an example mobile commerce system and/or environment including a mobile wallet application on a mobile device.

In particular, according to embodiments herein, a mobile wallet application on a mobile device and a wallet server used predetermined shared data to generate an encryption key for encrypting a session key which is both dynamically generated at run-time (reducing vulnerability) and specific to the mobile wallet application on the mobile device (reducing exposure).

The features discussed above are described in further detail below, with reference to FIGS. 1-5.

The terms "wallet client," "mobile wallet application," "mobile wallet" and/or the plural forms of these terms are used interchangeably herein to refer to a mobile wallet application on a mobile device.

The terms "mobile wallet server," "server" and/or the plural forms of these terms are used interchangeably herein to refer to a server system or other computing device which manages communications with the mobile wallet application on a mobile device.

System

Figure 1:
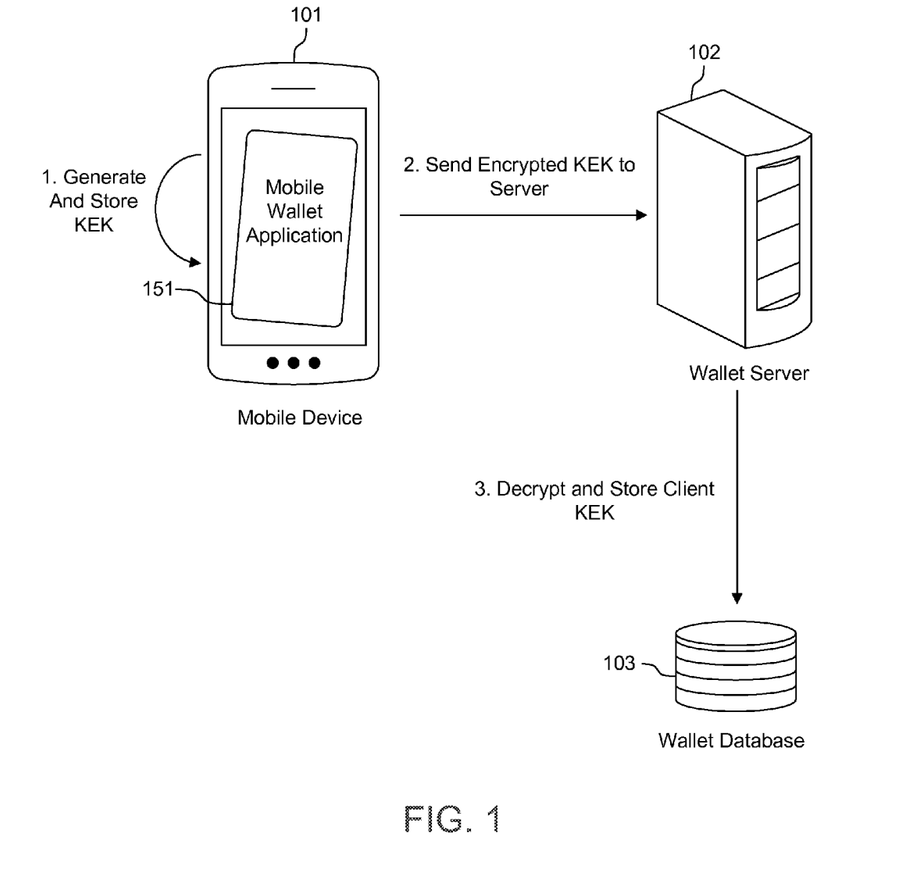
FIG. 1 is a diagram of a mobile commerce system for providing key encryption according to an exemplary embodiment.

FIG. 1 is a diagram of a mobile commerce system for providing key encryption according to an exemplary embodiment.

In FIG. 1, mobile device 101 communicates with wallet server 102, which in turn communicates with wallet database 103. Aspects of example hardware for the mobile device 101, wallet server 102, and wallet database 103 are described more fully below with respect to FIG. 5.

As shown in FIG. 1, mobile device 101 generates and stores a key encryption key (KEK). Mobile device 101 transmits an encrypted version of the KEK to wallet server 102. Wallet server 102 decrypts the encrypted KEK received from the mobile device 101 and stores the unencrypted KEK in wallet database 103, in association with the mobile device 101. Each of these processes will be described in further detail below with reference to FIGS. 2 and 3.

Mobile device 101 may be, for example, a cellular phone, tablet or the like, including, for example, a processor, a memory, a network interface and a display screen.

Mobile device 101 includes a mobile wallet application 151, which is an application stored on a memory of the mobile device 101. Mobile wallet application 151 includes instructions which, when executed by a processor of the mobile device 101, cause the mobile device 101 to act as an instrument for processing contactless transactions and the like. Mobile wallet application 151 also includes (e.g., uses, operates on, is associated with) data which may be stored on the memory of the mobile device 101 and/or on a secure element associated with the mobile device 101.

A secure element may be hardware and/or software implemented to store sensitive information and/or code applets, applications and packages. Physically, the secure element may be implemented as a universal integrated circuit card, an embedded secure element, or a micro secure digital (micro SD) card. Alternatively, the secure element may be implemented as a secure storage communicatively connected to the mobile device. For example, such a secure element may be cloud-based, virtual or remote storage.

The secure element on mobile device 101 also stores other companion "applets," which mobile wallet application 151 uses to perform different processes. For example, a wallet companion applet (WCAp) 152 (shown in FIG. 3) may be stored on the secure element of the mobile device, and may be used as a companion and/or representative of mobile wallet application 151. Example aspects of a secure element are described in U.S. patent application Ser. No. 13/901,188, entitled "Systems, Methods, And Computer Program Products For Providing A Contactless Protocol", the contents of which are incorporated herein by reference.

Figure 3:
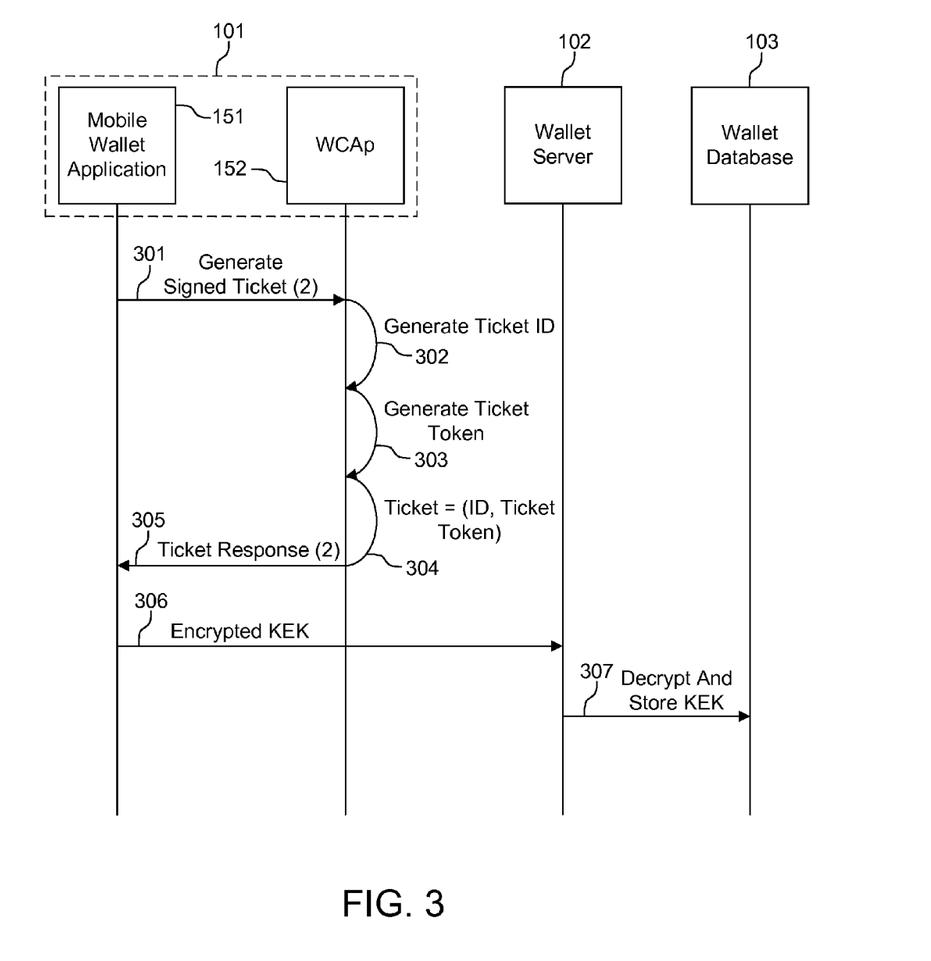
FIG. 3 is a sequence diagram illustrating a process for providing key encryption according to an exemplary embodiment.

In one example embodiment, mobile wallet application 151 may use WCAp 152 for, among other things, securely storing and managing data (e.g., critical data) in the secure element on its behalf. In one example embodiment, WCAp 152 maintains and/or stores data (e.g., data objects, data elements) used, or which may be used, by mobile wallet application 151 in the processing of contactless transactions.

Wallet server 102 is, e.g., a server system or other computing device which manages communications with the mobile wallet application 151 on mobile device 101, and provides interfaces for communication with other computer systems.

Wallet database 103 stores data that wallet server 102 may utilize to perform one or more functions. For example, the wallet database 103 may store the KEK received from mobile device 101, after decryption by wallet server 102, for use in a subsequent single sign-on (SSO) communication session, as described more fully below with respect to FIG. 2. In example embodiments, wallet database 103 may be physically incorporated in wallet server 102, or may be separate from wallet server 102.

Process

Figure 2:
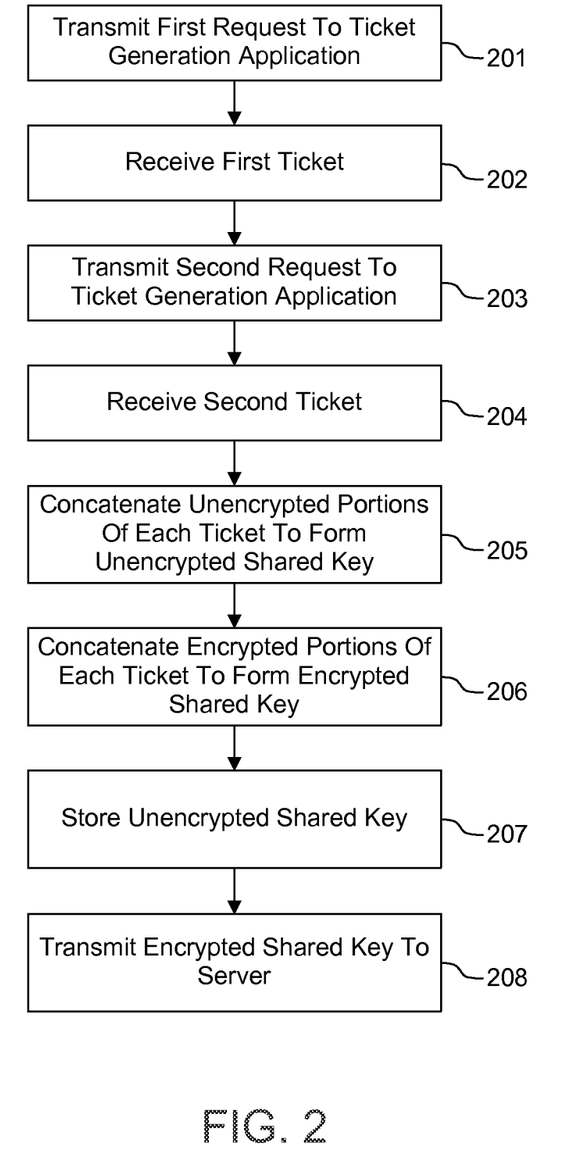
FIG. 2 is a flowchart illustrating the steps for providing key encryption according to an exemplary embodiment.

FIG. 2 is a flowchart illustrating the steps for providing key encryption according to an exemplary embodiment.

In step 201, the mobile wallet application 151 on mobile device 101 transmits a first request to a ticket generation application resident on mobile wallet application 151. In one example, the ticket generation application is WCAp 152 stored on the secure element of the mobile device 101.

In particular, the mobile wallet application 151 on mobile device 101 can transmit a ticket request ("first request") to WCAp 152, e.g., by calling a function "GenerateSignedTicket" of WCAp 152. In response, WCAp 152 generates and returns a signed ticket which includes combinations of a ticket identification (ticket ID), which is a sequence of bits (e.g., 8 bytes) which changes predictably over time (i.e., a continuously running sequence counting from 0 to 999999), and a ticket token, which is a random number (e.g., 8 bytes). Thus, the ticket generation application generates tickets using at least a ticket token, the ticket token being a random value unique to the ticket token, and a ticket ID, which is based on a constantly changing sequence. The ticket ID and ticket token are therefore unique to each ticket request, such as the first request transmitted at step 201.

In particular, a returned "ticket" is an exclusive OR operation (XOR) of the bits of the ticket ID and the ticket token (ticket ID XOR ticket token). An XOR operation is a logical operation that outputs true whenever both inputs differ (e.g., when one is "1" and the other is "0").

Each call to the "GenerateSignedTicket" function may return an encrypted version of the same ticket. The encrypted ticket is created by encrypting the XOR of the ticket ID and ticket token using an authentication key known by the WCAp 151 by, for example, having been provided that authentication key by wallet server 102 during activation.

More specifically, during wallet activation, wallet server 102 creates an "authentication key" corresponding to each mobile wallet application (e.g., mobile wallet application 151 or a wallet identification (wallet ID) corresponding thereto). Wallet server 102 stores that authentication key in its database (e.g., wallet database 103) and also sends it to be stored in WCAp 152 on the secure element of mobile device 101.

Thus, after mobile wallet application 151 is activated, an authentication key corresponding to mobile wallet application 151 is stored in (1) the secure element corresponding to the mobile device on which mobile wallet application 151 is installed, and (2) wallet database 103.

When a user wants to access an issuer's site through mobile wallet application 151, a session must be set up. Accordingly, mobile wallet application 151 communicates with WCAp 152 on the secure element and calls the aforementioned GenerateSignedTicket function.

In step 202, the mobile wallet application 151 on mobile device 101 receives a ticket ("first ticket") from WCAp 152 in response to the first request. Specifically, in response to the first call to the GenerateSignedTicket function, WCAp 152 generates a ticket ID1, and generates a ticket token1. In turn, the WCAp 152 uses the ticket ID1 and ticket token1 to create a ticket1, by XOR'ing the ticket ID1 and the ticket token1. That ticket1 is unencrypted and can be referred to as KEK1.

WCAp 152 then performs the same XOR operation (or, alternatively, uses the result of the first XOR operation) using the ticket ID1 and ticket token1, and encrypts the resulting ticket1 using the authentication key which is only stored in the secure element of mobile device 101 and wallet server 102. Thus, the authentication key in WCAp 152 is a "shared secret" used by both mobile wallet application 151 and wallet server 102. That resulting encrypted ticket1 can be referred to as encrypted KEK1.

In step 203, mobile wallet application 151 on mobile device 101 transmits a second request to WCAp 152 for a ticket (e.g., calls the GenerateSignedTicket function). In turn, the WCAP 152 generates a new ticket ID2 and ticket token2, XOR's those to create a ticket2 (to be referred to as "KEK2" or "second ticket"), and in turn encrypts ticket2 using the authentication key (the "shared secret" discussed above) to obtain encrypted ticket2. That resulting encrypted ticket2 can be referred to as encrypted KEK2.

In step 204, mobile wallet application 151 on mobile device 101 receives the second ticket, including a second unencrypted portion and a second encrypted portion, from the WCAp 152. In particular, mobile wallet application 151 on mobile device 101 receives the second unencrypted portion KEK2, and the second encrypted portion encrypted KEK2. As above, each of KEK2 and encrypted KEK2 can be 8 bytes, for a total of 16 bytes returned to the mobile wallet application 151.

In step 205, the mobile wallet application 151 on the mobile device 101 combines (e.g. concatenates) the unencrypted portions of each ticket to form an unencrypted key. Specifically, the mobile wallet application 151 combines KEK1 and KEK2 to form an unencrypted key ("KEK"). In this example, KEK is 16 bytes (8 bytes of KEK1+8 bytes of KEK2).

In step 206, the mobile wallet application 151 on mobile device 101 concatenates the encrypted portions of each ticket to form an encrypted key. In particular, the mobile wallet application 151 concatenates encrypted KEK1 with encrypted KEK2 to arrive at encrypted KEK. As with KEK in this example, encrypted KEK is also 16 bytes (8 bytes of encrypted KEK1+8 bytes of encrypted KEK2).

Thus, as a result of calling the GenerateSignedTicket function of WCAp 152 and combining the results as described above, the mobile wallet application 151 has two versions of a key—one unencrypted version (KEK) and one encrypted version (encrypted KEK).

In step 207, the mobile wallet application 151 on mobile device 101 stores the unencrypted key KEK locally. Thus, WCAp 152 stores KEK locally at mobile device 101, for example in the secure element of the mobile device 101.

In step 208, the encrypted key (encrypted KEK) is transmitted to wallet server 102.

Wallet server 102, in turn, communicates with wallet database 103 to obtain the authentication key associated with mobile wallet application 151 (or the wallet ID corresponding to wallet application 151). Wallet server 102 then decrypts the first half of the encrypted KEK using the authentication key, to arrive at (unencrypted) KEK1, and then decrypts the second half of the encrypted KEK using the authentication key, to arrive at (unencrypted KEK2). Wallet server 102 then combines (e.g. concatenates) KEK1 and KEK2 to arrive at KEK, which it stores in wallet database 103 in association with mobile wallet application 151 (or its wallet ID).

Thus, wallet server 102 and mobile wallet application 151 both now have a fully encrypted and secure secret which they share, that is, the KEK. That is, when a user wishes to access an issuer site, wallet server 102 may send to the mobile wallet application 151 a session encryption key and session sign-on key, both of which wallet server 102 has encrypted using the KEK. Mobile wallet application 151, now having the KEK stored in the secure element (by the WCAp 152), can decrypt the received session encryption key and session sign-on key using the KEK.

FIG. 3 is a sequence diagram illustrating a process for providing key encryption according to an exemplary embodiment.

In particular, FIG. 3 depicts a sequence diagram of communications between mobile wallet application 151 and WCAp 152 on mobile device 101, wallet server 102, and wallet database 103.

As shown in FIG. 3, in step 301, mobile wallet application 151 sends two "Generate Signed Ticket" requests to WCAp 152 (e.g., calls the function GenerateSignedTicket twice). For purposes of simplicity, these requests are discussed together, but it should be understood that the requests may instead be sent sequentially, with a combination of the results from one request being performed before making the next request.

In response to each request, in step 302, WCAp 152 generates a ticket ID, and in step 303, generates a ticket token. In step 304, the ticket is generated from a combination of the ticket ID and ticket token as discussed above with reference to FIG. 2. The encrypted portions returned by WCAp 152 are encrypted using an authentication key provided during activation, as discussed above with reference to FIG. 2. Steps 302 to 304 are performed for each of the two "Generate Signed Ticket" requests.

In step 305, mobile wallet application 151 receives the ticket responses to each of the requests sent in step 301. The ticket responses to the above requests contain KEK1 and encrypted KEK1 (first ticket request), and KEK2 and encrypted KEK2 (second ticket request). Mobile wallet application 151 combines KEK1 and KEK2 to form KEK and stores it locally.

In step 306, the encrypted KEK is sent to wallet server 102. Additional information, such as an ID identifying mobile wallet application 151, may also be transmitted therewith.

In step 307, wallet server 102 decrypts the encrypted KEK, and stores the KEK (along with associated information such as a wallet ID) in wallet database 103.

Figure 4:
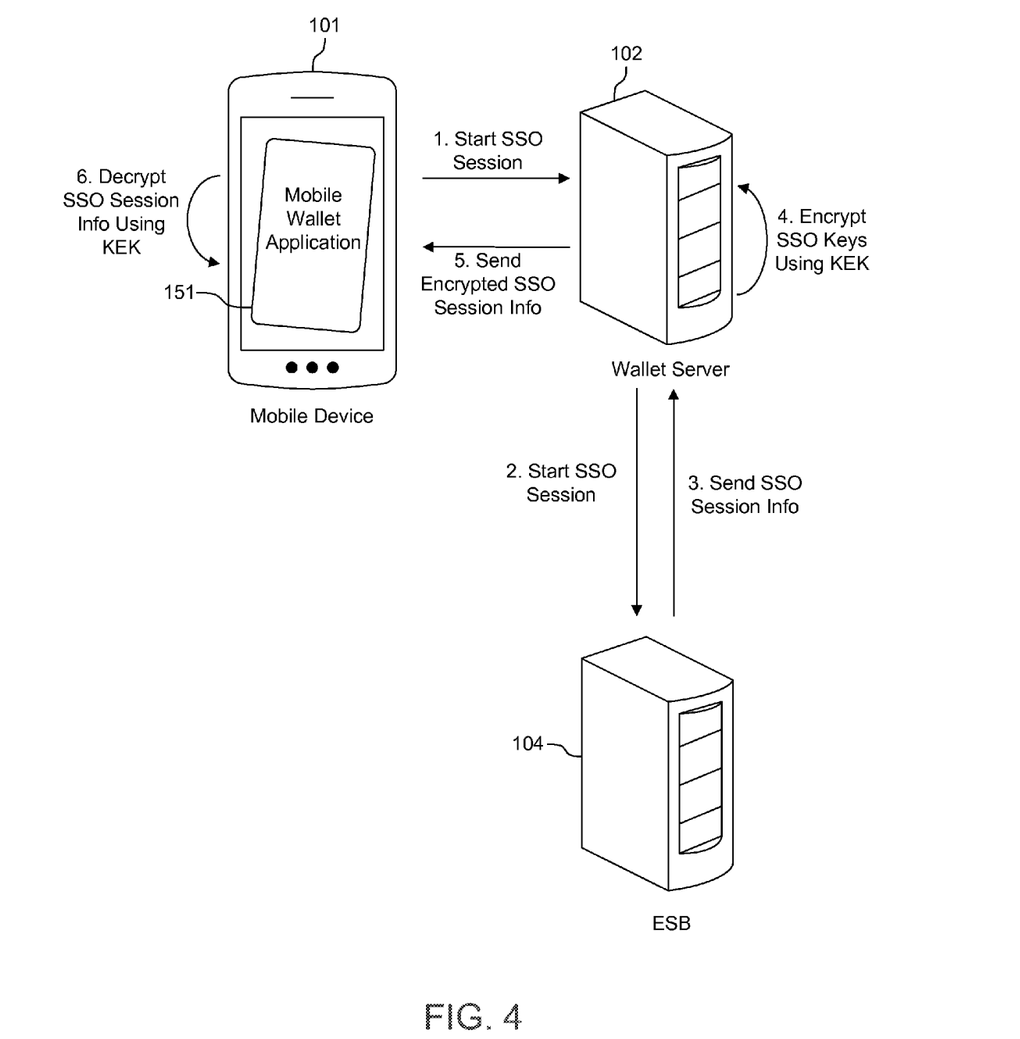
FIG. 4 is a view of an exemplary system and process for application validation according to an exemplary embodiment.

FIG. 4 is a view of an exemplary system and process for application validation according to an exemplary embodiment. In particular, FIG. 4 is a view of an exemplary system and process for a single sign-on (SSO) communication session between the mobile wallet application 151 on mobile device 101 and wallet server 102.

In that regard, one example environment in which key encryption is used is a sign-on with a service provider such as a card issuer associated with the user's mobile wallet, e.g., the mobile wallet on mobile device 101. When the user views, for example, a credit card or payment card on mobile device 101, the card may have buttons or other inputs allowing management of the card. Nevertheless, the actions for the card are often performed on the issuer side (e.g., at the issuer site), not at the mobile device 101 or the mobile wallet application interface. As such, there is a need for the mobile device 101 to communicate securely with the issuer. Moreover, for purposes of convenience, it is desirable to require only one sign-on with user credentials (e.g., with an ID and password) to verify that the user is valid.

In one example, a user of a mobile wallet application (e.g., mobile wallet application 151 on mobile device 101) wants to access an issuer's website (e.g., Bank of America, etc.) via the mobile wallet application 151 (and/or its interface), rather than the issuer's website. To do so, mobile wallet application 151 must authenticate itself to wallet server 102, ideally without having to ask the user of the mobile wallet application 151 to enter the user's credentials for the issuer's site again.

Thus, a single session sign-on key is used by mobile wallet application 151 to authenticate itself to the wallet server 102 (which, in turn, notifies the issuer that the client has been authenticated and thus access is OK). As mentioned above, the sign-on key has previously been encrypted using a hardcoded key stored on the client and the server. However, this is problematic because it would make all systems vulnerable, and if the key is changed, it would be a lot of work to update every client. Sending a sign-on key that is not encrypted is not a realistic solution to the problem because of the obvious vulnerability problems.

The foregoing issues are addressed, however, by encrypting the session sign-on key using a KEK generated as discussed above.

Thus, FIG. 4 depicts one example embodiment in which the KEK generated as described above may be used.

As shown in FIG. 4, an additional party to this process is enterprise service bus (ESB) 104. ESB 104 is provided for managing communications between mutually interacting systems and/or entities. In an exemplary embodiment, the ESB 104 is operable to perform duties such as managing and controlling requests and messages, handling and choreographing events, queuing and organizing events, etc. Interacting systems and/or entities may be publishers that transmit data to ESB 104. In turn, ESB 104 publishes the data to subscriber systems, such as systems corresponding to (or controlled and/or managed by) entities such as mobile network operators (MNOs), trusted service managers (TSMs), mobile wallets, mobile wallets issuers, and/or service providers.

ESB 104 is communicatively coupled to the wallet server 102 by any suitable communication channel. In some example embodiments, ESB 104 is communicatively coupled to the wallet server 102 by way of a direct connection, a proprietary network, a private network, a virtual private network (VPN), a network employing Hypertext Transfer Protocol (HTTP) standards, the Internet, and/or another type of network. ESB 104, in another example, is communicatively coupled to the wallet server 102 via a secured communication channel.

As shown in FIG. 4, mobile device 101 sends a request to start an SSO session to wallet server 102. In response, wallet server 102 sends an instruction to ESB 104 to start an SSO session. ESB 104 then communicates with an issuer (not shown) to request opening of the SSO session. The issuer returns SSO session information, which includes two SSO encryption keys for the SSO communication and the issuer URL, and ESB 104 forwards this session information to wallet server 102.

Wallet server 102 encrypts the SSO encryption keys and the SSO session information received from ESB 104 using the KEK, and transmits the encrypted SSO session information to mobile device 101. In turn, mobile device 101 uses the KEK stored at its end to decrypt the SSO session information and obtain the encryption keys.

As a result, a secure SSO communication session is established between mobile device 101 and wallet server 102. In turn, mobile device 101 may establish a communication session with the issuer.

Example Computer—Readable Medium Implementations

The example embodiments described above such as, for example, the systems and procedures depicted in or discussed in connection with FIGS. 1-4 or any part or function thereof, may be implemented by using hardware, software or a combination of the two. The implementation may be in one or more computers or other processing systems. While manipulations performed by these example embodiments may have been referred to in terms commonly associated with mental operations performed by a human operator, no human operator is needed to perform any of the operations described herein. In other words, the operations may be completely implemented with machine operations. Useful machines for performing the operation of the example embodiments presented herein include general purpose digital computers or similar devices.

Figure 5:
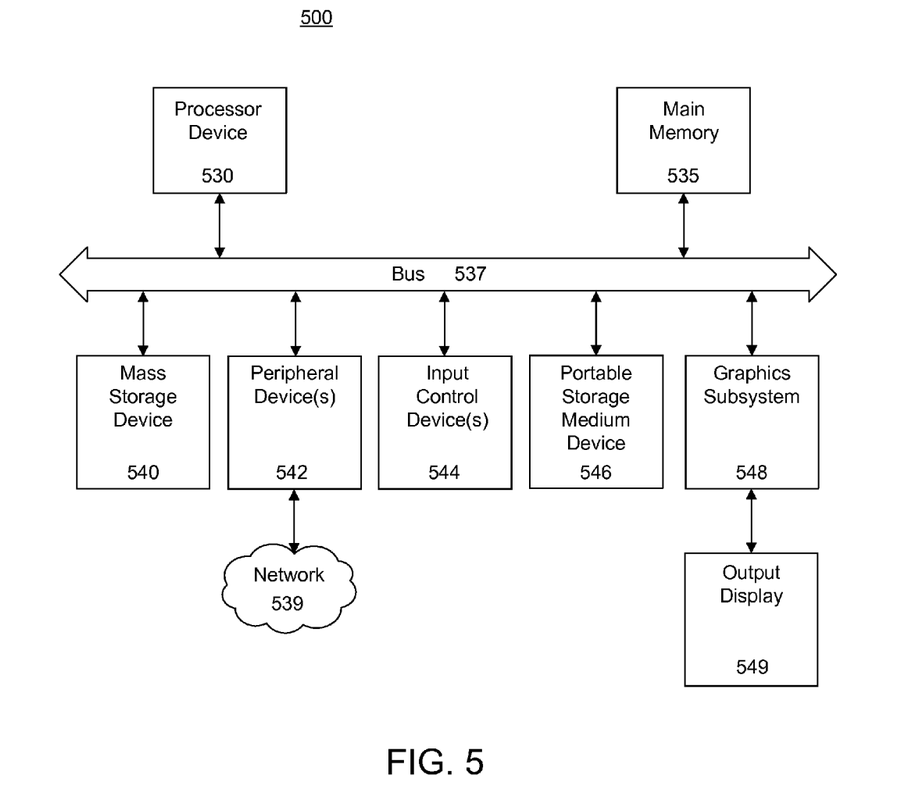
FIG. 5 is a block diagram of a general or special purpose computer.

FIG. 5 is a block diagram of a general and/or special purpose computer 500, which may be a general and/or special purpose computing device, in accordance with some of the example embodiments of the invention. The computer 500 may be, for example, a user device, a user computer, a client computer and/or a server computer, among other things.

The computer 500 may include without limitation a processor device 530, a main memory 535, and an interconnect bus 537. The processor device 530 may include without limitation a single microprocessor, or may include a plurality of microprocessors for configuring the computer 500 as a multi-processor system. The main memory 535 stores, among other things, instructions and/or data for execution by the processor device 530. The main memory 535 may include banks of dynamic random access memory (DRAM), as well as cache memory.

The computer 500 may further include a mass storage device 540, peripheral device(s) 542, portable non-transitory storage medium device(s) 546, input control device(s) 544, a graphics subsystem 548, and/or an output display 549. For explanatory purposes, all components in the computer 500 are shown in FIG. 5 as being coupled via the bus 537. However, the computer 500 is not so limited. Devices of the computer 500 may be coupled via one or more data transport means. For example, the processor device 530 and/or the main memory 535 may be coupled via a local microprocessor bus. The mass storage device 540, peripheral device(s) 542, portable storage medium device(s) 546, and/or graphics subsystem 548 may be coupled via one or more input/output (I/O) buses. The mass storage device 540 may be a nonvolatile storage device for storing data and/or instructions for use by the processor device 530. The mass storage device 540 may be implemented, for example, with a magnetic disk drive or an optical disk drive. In a software embodiment, the mass storage device 540 is configured for loading contents of the mass storage device 540 into the main memory 535.

The portable storage medium device 546 operates in conjunction with a nonvolatile portable storage medium, such as, for example, a compact disc read only memory (CD-ROM), to input and output data and code to and from the computer 500. In some embodiments, the software for storing information may be stored on a portable storage medium, and may be inputted into the computer 500 via the portable storage medium device 546. The peripheral device(s) 542 may include any type of computer support device, such as, for example, an input/output (I/O) interface configured to add additional functionality to the computer 500. For example, the peripheral device(s) 542 may include a network interface card for interfacing the computer 500 with a network 439.

The input control device(s) 544 provide a portion of the user interface for a user of the computer 500. The input control device(s) 544 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the computer 500 may include the graphics subsystem 548 and the output display 549. The output display 549 may include a cathode ray tube (CRT) display and/or a liquid crystal display (LCD). The graphics subsystem 548 receives textual and graphical information, and processes the information for output to the output display 549.

Each component of the computer 500 may represent a broad category of a computer component of a general and/or special purpose computer. Components of the computer 500 are not limited to the specific implementations provided here.

Software embodiments of the example embodiments presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine- or computer-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment.

The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further include software for performing example aspects of the invention, as described above.

Included in the programming and/or software of the general and/or special purpose computer or microprocessor are software modules for implementing the procedures described above.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above-described example embodiments, but should be defined only in accordance with the following claims and their equivalents.

In addition, it should be understood that the accompanying figures are presented for example purposes only. The architecture of the example embodiments presented herein is sufficiently flexible and configurable, such that it may be utilized and navigated in ways other than that shown in the accompanying figures. Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A system to provide application validation, comprising: a mobile computing device, the mobile computing device comprising: at least one memory, and a processor communicatively coupled to the memory, wherein the processor executes application code instructions that are stored in the memory to cause the mobile computing device to: transmit a request for a first ticket to a wallet companion application on the mobile computing device, the first ticket comprising a first unencrypted portion and a first encrypted portion, the wallet companion application generating the first unencrypted portion using a first predicted ticket identification and a first randomly generated ticket token; receive the first ticket from the wallet companion application; transmit a request for a second ticket to the wallet companion application, the second ticket comprising a second unencrypted portion and a second encrypted portion, the wallet companion application generating the second unencrypted portion using a second predicted ticket identification and a second randomly generated ticket token; receive the second ticket from the wallet companion application; concatenate the first unencrypted portion of the first ticket and the second unencrypted portion of the second ticket to form an unencrypted shared encryption key, store the unencrypted shared encryption key; concatenate the first encrypted portion of the first ticket and the second encrypted portion of the second ticket to form an encrypted shared encryption key; transmit the encrypted shared encryption key to a wallet server external to the mobile computing device, the wallet server decrypting the encrypted shared encryption key to determine the first encrypted portion of the first ticket and the second encrypted portion of the second ticket, and the wallet server combining the first encrypted portion of the first ticket and the second encrypted portion of the second ticket to re-form the unencrypted shared encryption key; and request access to restricted information, the wallet server encrypting a session sign-on key using the unencrypted shared encryption key and transmitting the encrypted session sign-on key to the wallet application.

2. The system of claim 1, wherein the processor is further configured to execute computer-executable instructions stored in the storage device to cause the system to:
receive the encrypted session sign-on key from the wallet server; and
decrypt the encrypted session sign-on key using the unencrypted shared encryption key stored, the decrypted session sign-on key permitting access to the restricted information.

3. The system of claim 1, wherein the wallet companion application is on a secure element.

4. The system of claim 1, wherein the first predicted ticket identification and the first randomly generated ticket token comprise shared between the wallet server and the wallet companion application.

5. The system of claim 1, wherein the first encrypted portion is an encrypted version of the first unencrypted portion generated by encrypting the first unencrypted portion using an authentication key shared between the wallet companion application and the wallet server.

6. The system of claim 1, wherein the first randomly generated ticket token comprises a random unique value.

7. A method to provide application validation, comprising: transmitting, by a wallet application on a mobile computing device, a request for a first ticket to a wallet companion application on the mobile computing device, the first ticket comprising a first unencrypted portion and a first encrypted portion, the wallet companion application generating the first unencrypted portion using a first predicted ticket identification and a first randomly generated ticket token; receiving, by the wallet application on the mobile computing device, the first ticket from the wallet companion application; transmitting, by the wallet application on the mobile computing device, a request for a second ticket to the wallet companion application, the second ticket comprising a second unencrypted portion and a second encrypted portion, the wallet companion application generating the second unencrypted portion using a second predicted ticket identification and a second randomly generated ticket token; receiving, by the wallet application on the mobile computing device, the second ticket from the wallet companion application; concatenating, by the wallet application on the mobile computing device, the first unencrypted portion of the first ticket and the second unencrypted portion of the second ticket to form an unencrypted shared encryption key; storing, by the wallet application on the mobile computing device, the unencrypted shared encryption key; concatenating, by the wallet application on the mobile computing device, the first encrypted portion of the first ticket and the second encrypted portion of the second ticket to form an encrypted shared encryption key; transmitting, by the wallet application on the mobile computing device, the encrypted shared encryption key to a wallet server external to the mobile computing device, the wallet server decrypting the encrypted shared encryption key to determine the first encrypted portion of the first ticket and the second encrypted portion of the second ticket, and the wallet server combining the first encrypted portion of the first ticket and the second encrypted portion of the second ticket to re-form the unencrypted shared encryption key; and requesting, by the wallet application on the mobile computing device, access to restricted information, the wallet server encrypting a session sign-on key using the unencrypted shared encryption key and transmitting the encrypted session sign-on key to the wallet application.

8. The method of claim 7, further comprising:
receiving, by the wallet application on the mobile computing device, the encrypted session sign-on key from the wallet server; and
decrypting, by the wallet application on the mobile computing device, the encrypted session sign-on key using the unencrypted shared encryption key stored by the wallet application, the decrypted session sign-on key permitting access to the restricted information via the wallet application.

9. The method of claim 7, wherein the wallet companion application is on a secure element.

10. The method of claim 7, wherein the first predicted ticket identification and the first randomly generated ticket token comprise values shared between the wallet server and the wallet companion application.

11. The method of claim 7, wherein the first encrypted portion is an encrypted version of the first unencrypted portion generated by encrypting the first unencrypted portion using an authentication key shared between the wallet companion application and the wallet server.

12. The method of claim 7, wherein the first randomly generated ticket token comprises a random unique value.

13. A computer program product comprising: a non-transitory computer readable medium having computer-readable program instructions embodied therein that when executed by a mobile computing device cause the mobile computing device to provide application validation, the computer-readable program instructions comprising: computer-readable program instructions to transmit request for a first ticket to a wallet companion application on the mobile computing device, the first ticket comprising a first unencrypted portion and a first encrypted portion, the wallet companion application generating the first unencrypted portion using a first predicted ticket identification and a first randomly generated ticket token; computer-readable program instructions to receive the first ticket from the wallet companion application; computer-readable program instructions to transmit transmitting a request for a second ticket to the wallet companion application, the second ticket comprising a second unencrypted portion and a second encrypted portion, the wallet companion application generating the second unencrypted portion using a second predicted ticket identification and a second randomly generated ticket token; computer-readable program instructions to receive the receiving a second ticket from the wallet companion application; computer-readable program instructions to concatenate the first unencrypted portion of the first ticket and the second unencrypted portion of the second ticket to form an unencrypted shared encryption key computer-readable program instructions to store the unencrypted shared encryption key; computer-readable program instructions to concatenate the first and second encrypted portions to form an encrypted shared encryption key; computer-readable program instructions to transmit the encrypted shared encryption key to a wallet server external to the mobile computing device, the wallet server decrypting the encrypted shared encryption key to determine the first encrypted portion of the first ticket and the second encrypted portion of the second ticket, and the wallet server combining the first encrypted portion of the first ticket and the second encrypted portion of the second ticket to re-form the unencrypted shared encryption key; and computer-readable program instructions to request access to restricted information, the wallet server encrypting a session sign-on key using the unencrypted shared encryption key and transmitting the encrypted session sign-on key to the wallet application.

14. The computer program product of claim 13, further comprising:
   computer-readable program instructions to receive the encrypted session sign-on key from the wallet service; and
   computer-readable program instructions to decrypt the encrypted session sign-on key using the unencrypted shared encryption key stored, the decrypted session sign-on key permitting access to the restricted information.

15. The computer program product of claim 13, wherein the wallet companion application is on a secure element.

16. The computer program product of claim 13, wherein the first predicted ticket identification and the first randomly generated ticket token comprise shared between the wallet server and the wallet companion application.

17. The computer program product of claim 13, wherein the first encrypted portion is an encrypted version of the first unencrypted portion generated by encrypting the first unencrypted portion using an authentication key shared between the wallet companion application and the wallet server.

18. The computer program product of claim 13, wherein the randomly generated ticket token comprises a random unique value.

* * * * *

UNITED STATES PATENT AND TRADEMARK OFFICE
CERTIFICATE OF CORRECTION

PATENT NO. : 9,497,185 B2  Page 1 of 1
APPLICATION NO. : 14/567184
DATED : November 15, 2016
INVENTOR(S) : Weimin Tsai It is certified that error appears in the above-identified patent and that said Letters Patent is hereby corrected as shown below:

In the Claims

Column 13, Claim 13, Line 31 should read --"form an unencrypted shared encryption key; computer-readable"--

Signed and Sealed this
Twenty-first Day of February, 2017

Michelle K. Lee
*Director of the United States Patent and Trademark Office*